US011327360B2

(12) United States Patent
Wang et al.

(10) Patent No.: US 11,327,360 B2
(45) Date of Patent: May 10, 2022

(54) DISPLAY PANEL, DISPLAY APPARATUS, DRIVING METHOD OF THE DISPLAY PANEL, AND STORAGE MEDIUM

(71) Applicant: BOE Technology Group Co., Ltd., Beijing (CN)

(72) Inventors: Fangzhou Wang, Beijing (CN); Pengxia Liang, Beijing (CN); Wei Wang, Beijing (CN); Xiaochuan Chen, Beijing (CN); Xianqin Meng, Beijing (CN); Xiandong Meng, Beijing (CN); Qiuyu Ling, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 119 days.

(21) Appl. No.: 16/962,853

(22) PCT Filed: Feb. 14, 2020

(86) PCT No.: PCT/CN2020/075365
§ 371 (c)(1),
(2) Date: Jul. 17, 2020

(87) PCT Pub. No.: WO2020/199763
PCT Pub. Date: Oct. 8, 2020

(65) Prior Publication Data
US 2021/0382351 A1  Dec. 9, 2021

(30) Foreign Application Priority Data

Apr. 2, 2019  (CN) .......................... 201910262587.6

(51) Int. Cl.
*G02F 1/1335*  (2006.01)
*G02F 1/133*  (2006.01)
*G02F 1/13357*  (2006.01)

(52) U.S. Cl.
CPC .... *G02F 1/133565* (2021.01); *G02F 1/13306* (2013.01); *G02F 1/133504* (2013.01);
(Continued)

(58) Field of Classification Search
None
See application file for complete search history.

(56) References Cited

U.S. PATENT DOCUMENTS

2011/0141395 A1  6/2011  Yashiro
2018/0024289 A1  1/2018  Fattal
(Continued)

FOREIGN PATENT DOCUMENTS

CN  106292049 A  1/2017
CN  106324897 A  1/2017
(Continued)

OTHER PUBLICATIONS

Office Action dated Apr. 8, 2020 for Chinese Patent Application No. 201910262587.6 and English Translation.
(Continued)

*Primary Examiner* — Phu Vu
(74) *Attorney, Agent, or Firm* — Ling Wu; Stephen Yang; Ling and Yang Intellectual Property

(57) ABSTRACT

Provided are a display panel, a display apparatus, a driving method of the display panel, and a computer readable storage medium. The display panel includes: a first substrate and a second substrate being arranged in box alignment, point light sources in an array arrangement being arranged on a side of the first substrate away from the second substrate, optical coupling devices corresponding to the point light sources one by one being arranged on a side of the first substrate close to the second substrate, a grating layer being arranged on a side of the optical coupling devices away from the first substrate, a liquid crystal layer
(Continued)

being arranged between the first substrate and the second substrate; and the optical coupling devices being arranged to reflect lights emitted by the corresponding point light sources, penetrating the first substrate, and reaching the optical coupling devices, into the first substrate.

20 Claims, 5 Drawing Sheets

(52) U.S. Cl.
CPC .. *G02F 1/133524* (2013.01); *G02F 1/133567* (2021.01); *G02F 1/133603* (2013.01); *G02F 1/133605* (2013.01); *G02F 1/133606* (2013.01); *G02F 2201/305* (2013.01)

(56) References Cited

U.S. PATENT DOCUMENTS

| | | | |
|---|---|---|---|
| 2019/0025644 A1 | 1/2019 | Tan et al. |
| 2019/0094447 A1 | 3/2019 | Tan et al. |
| 2019/0204583 A1 | 7/2019 | Tan et al. |
| 2019/0339566 A1 | 11/2019 | Tan et al. |
| 2020/0166680 A1 | 5/2020 | Meng et al. |
| 2020/0285104 A1 | 9/2020 | Meng et al. |
| 2020/0371279 A1 | 11/2020 | Meng et al. |

FOREIGN PATENT DOCUMENTS

| | | |
|---|---|---|
| CN | 107193070 A | 9/2017 |
| CN | 107422532 A | 12/2017 |
| CN | 107533255 A | 1/2018 |
| CN | 107621729 A | 1/2018 |
| CN | 107817629 A | 3/2018 |
| CN | 108051915 A | 5/2018 |
| CN | 108398830 A | 8/2018 |
| CN | 108646338 A | 10/2018 |
| CN | 108717243 A | 10/2018 |
| CN | 109061948 A | 12/2018 |
| CN | 109212834 A | 1/2019 |
| CN | 109856861 A | 6/2019 |
| WO | 2010010749 A1 | 1/2010 |
| WO | 2014081415 A1 | 5/2014 |
| WO | 2020093766 A1 | 5/2020 |

OTHER PUBLICATIONS

Office Action dated Sep. 23, 2020 for Chinese Patent Application No. 201910262587.6 and English Translation.
International Search Report for PCT/CN2020/075365 dated Apr. 28, 2020.

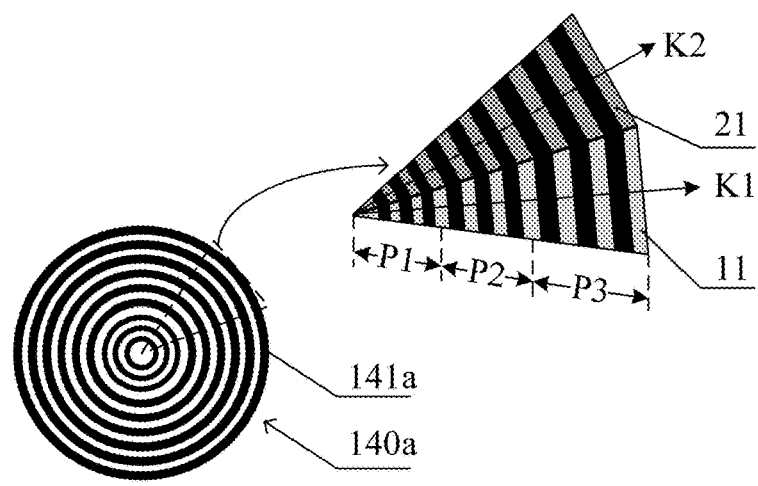

FIG. 7

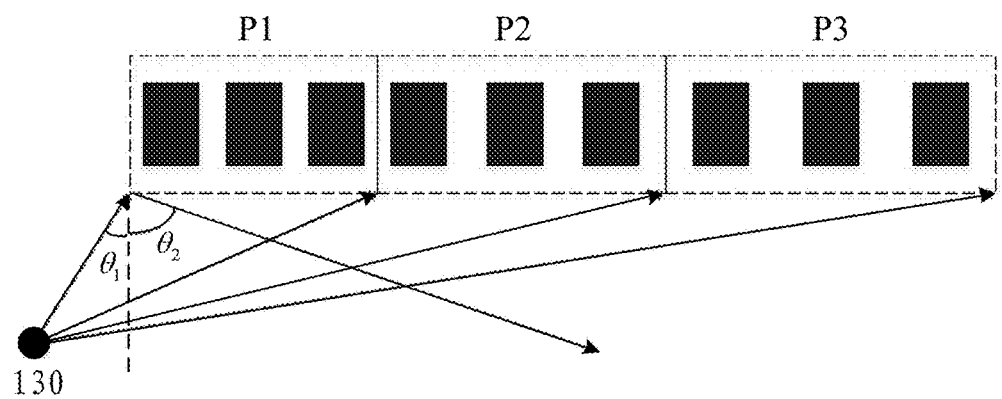

FIG. 8

```
Turn on point light sources in the display panel to enable optical
coupling devices corresponding to the point light sources to reflect      S310
lights emitted by the point light sources, penetrating a first substrate,
and reaching the optical coupling devices into the first substrate
                              ↓
Adjust a refractive index of a liquid crystal layer in
the display panel to control open or close of a grating
in a grating layer to enable the lights in the first substrate            S320
to emit from an open grating in the grating layer
```

FIG. 9

DISPLAY PANEL, DISPLAY APPARATUS, DRIVING METHOD OF THE DISPLAY PANEL, AND STORAGE MEDIUM

CROSS-REFERENCE TO RELATED APPLICATIONS

The present application is a U.S. National Phase Entry of International Application No. PCT/CN2020/075365 having an international filing date of Feb. 14, 2020, which claims the priority of Chinese Patent Application No. 201910262587.6 filed to the CNIPA on Apr. 2, 2019, entitled "Display panel, Display Apparatus, and Driving Method of the Display Panel". The above-identified applications are hereby incorporated by reference in their entirety.

TECHNICAL FIELD

Embodiments of the present disclosure relate to, but are not limited to, the technical field of photoelectrons, in particular to a display panel, a display apparatus, a driving method of the display panel, and a computer readable storage medium.

BACKGROUND

With development of display technology and wide application of display devices, a transparent display device has become a mainstream product type in display products due to its wide application scenarios. In order to achieve a transparent display effect, a common Liquid Crystal Display (LCD) device usually uses an edge-lit backlight module, that is, a light source enters from a side of a lower substrate, and the display effect is achieved through the backlight module.

An LCD panel realizes a transparent display effect through an edge-lit backlight, and the problems of uneven display brightness and low energy exist in the whole LCD panel, especially for application scenarios of a large-size LCD panel, the problems of uneven brightness and low energy in display are more obvious.

SUMMARY

The following is a summary of subject matter described in detail herein. This summary is not intended to limit the scope of protection of the claims.

Embodiments of the present disclosure provide a display panel, a display apparatus, a driving method of the display panel, and a computer readable storage medium.

In a first aspect, an embodiment of the present disclosure provides a display panel, including: a first substrate and a second substrate being arranged inbox alignment, wherein point light sources in an array arrangement are arranged on a side of the first substrate away from the second substrate, optical coupling devices corresponding to the point light sources one by one being arranged on a side of the first substrate close to the second substrate, a grating layer being arranged on a side of the optical coupling devices away from the first substrate, a liquid crystal layer being arranged between the first substrate and the second substrate; and the optical coupling devices being arranged to reflect lights emitted by the corresponding point light sources, penetrating the first substrate, and reaching the optical coupling devices, into the first substrate.

In one exemplary embodiment, in the display panel as described above, the display panel is arranged to open or close a grating in the grating layer by adjusting a refractive index of liquid crystal to enable the lights in the first substrate to exit from an open grating in the grating layer.

In one exemplary embodiment, in the display panel as described above, the display panel is arranged to realize display of different gray scales by adjusting a difference between the refractive index of the liquid crystal and a refractive index of the grating in the grating layer.

In one exemplary embodiment, the display panel described above further includes a first electrode layer being arranged between the optical coupling device and the grating layer, and a second electrode layer being arranged on a side of the liquid crystal layer close to the second substrate, wherein the first electrode layer and the second electrode layer is arranged to be provided with a voltage to control a refractive index of liquid crystal in the liquid crystal layer.

In one exemplary embodiment, the display panel described above further includes a flat layer arranged between the optical coupling device and the first electrode layer; and the refractive indices of the first substrate, the flat layer, and the first electrode layer are identical and greater than the refractive index of the grating layer.

In one exemplary embodiment, in the display panel as described above, refractive indices of the second substrate and the second electrode layer are identical, and the refractive indices of the grating layer, the second substrate and the second electrode layer are all smaller than a refractive index of the first substrate.

In one exemplary embodiment, in the display panel described above, the point light sources include a light emitting diode or a micro light emitting diode.

In one exemplary embodiment, in the display panel as described above, the optical coupling devices include a radial grating or a holographic grating.

In one exemplary embodiment, in the display panel as described above, the optical coupling devices include the radial grating, the radial grating includes a plurality of annular wire grids arranged in concentric circles, and a grating period of the radial grating gradually increases from a position close to a center of a circle to a position away from the center of the circle along radiuses of the annular wire grids.

In one exemplary embodiment, in the display panel as described above, the optical coupling devices include the holographic grating, the holographic grating includes a plurality of bar-shaped wire grids arranged in parallel, and a grating period of the holographic grating gradually increases along a first direction, and the first direction is perpendicular to the bar-shaped wire grid.

In one exemplary embodiment, in the display panel described above, a pixel size of the display panel is 5 to 50 times a grating period in the grating layer.

In a second aspect, an embodiment of the present disclosure also provides a display apparatus, including the display panel according to any one of the above.

In a third aspect, an embodiment of the present disclosure also provides a driving method of a display panel, wherein the display panel is the display panel of any one of the above, and the driving method includes: turning on the point light sources in the display panel, wherein the lights emitted by the point light sources, penetrating the first substrate, and reaching the optical coupling devices are reflected into the first substrate by the optical coupling devices corresponding to the point light sources; and adjusting a refractive index of the liquid crystal layer in the display panel to control open or close of a grating in the grating layer to enable the lights in the first substrate to exit from an open grating in the grating layer.

In one exemplary embodiment, in the driving method of the display panel as described above, the adjusting the refractive index of the liquid crystal layer in the display panel to control the open or close of the grating in the grating layer includes at least one of the following: adjusting the refractive index of the liquid crystal in a first area in the liquid crystal layer to be unequal to a refractive index of the grating layer, to control a grating in an orthographic projection area of the first area on a plane where the grating layer is located to open, enabling the lights reaching the open grating to exit from the open grating; wherein a diffraction efficiency of lights passing through the open grating changes with the refractive index of the liquid crystal; and adjusting the refractive index of the liquid crystal in a second area in the liquid crystal layer to be equal to the refractive index of the grating layer, to control a grating in the orthographic projection area of the second area on the plane where the grating layer is located to close, enabling lights reaching the closed grating to be reflected totally on a surface of the closed grating close to the first substrate.

In one exemplary embodiment, in the driving method of the display panel as described above, the adjusting the refractive index of the liquid crystal in the first area in the liquid crystal layer to be unequal to a refractive index of the grating layer, includes: controlling a refractive index of the liquid crystal in the first area in the liquid crystal layer to change within a preset refractive index range, enabling the diffraction efficiency of the lights passing through the open grating to change to realize the display of different gray scales.

In a fourth aspect, an embodiment of the present disclosure also provides a computer-readable storage medium storing executable instructions. When the executable instructions are executed by a processor, the driving method of the display panel as described in any one of the above is implemented.

Other aspects will become apparent upon reading and understanding accompanying drawings and the detailed description.

BRIEF DESCRIPTION OF DRAWINGS

FIG. 7 is a schematic diagram of a structure of a radial grating in a display panel according to an embodiment of the present disclosure.

FIG. 8 is a structure of a grating of an area microelement in the radial grating shown in FIG. 7 in a K1 direction.

FIG. 9 is a flowchart of a driving method of a display panel according to an embodiment of the present disclosure.

DETAILED DESCRIPTION

Hereinafter, embodiments of the present disclosure will be described in detail with reference to the accompanying drawings. Without conflict, embodiments in the present application and features in the embodiments may be combined with each other arbitrarily.

Figure 1:
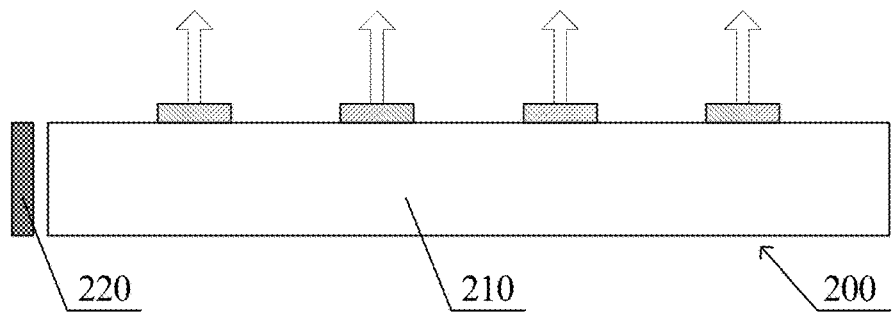
FIG. 1 is a schematic diagram of a structure of a light source in an LCD display panel.
Figure 2:
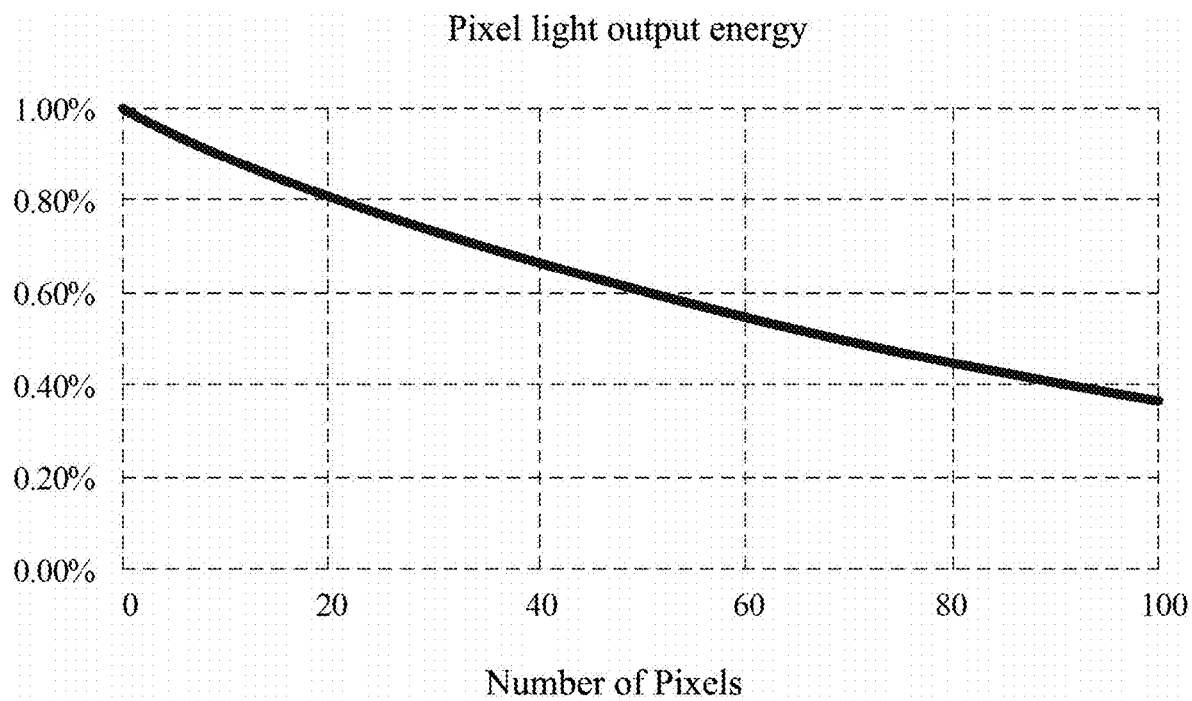
FIG. 2 is a graph of relationship between the number of pixels and light output energy in the LCD display panel shown in FIG. 1.

For an ordinary LCD display panel, in order to realize a transparent display, an edge light entering method is often used, that is, an edge-lit type backlight module is adopted, which will lead weakening of a light output intensity along with increasing of light output times. For this reason, it is possible to design different sizes of light output ports for different light output positions, but certain cost may be increased for processing and it is not conducive for large-scale of a device. FIG. 1 is a schematic diagram of a structure of a light source in an LCD display panel. A left side surface of a lower substrate 210 of the LCD display panel 200 shown in FIG. 1 is provided with an edge-lit type backlight module 220. Assuming that light source energy is 1 and a diffraction light exit efficiency of bright pixels is 1%, that is, a light output ratio is 1%, the brightness from the first light exit to the n-th light exit decreases. As shown in FIG. 1, the light energy of the n-th pixel from the left to the right of the display panel 200 is $0.99^{N}*0.01$. FIG. 2 is a graph of relationship between the number of pixels and a light output energy in the LCD display panel shown in FIG. 1. It can be seen that a light loss of the edge-lit light source arranged on a single side is a very serious problem because the light travels in one direction in the substrate. Therefore, a solution of LCD panel realizing transparent display effect through edge-lit backlight has the problems of uneven display brightness and low energy in the whole LCD panel due to the influence of light exit mode of edge-lit backlight.

The following embodiments provided by the present disclosure can be combined with each other, and the same or similar concepts or processes may not be repeated in some embodiments.

Figure 3:
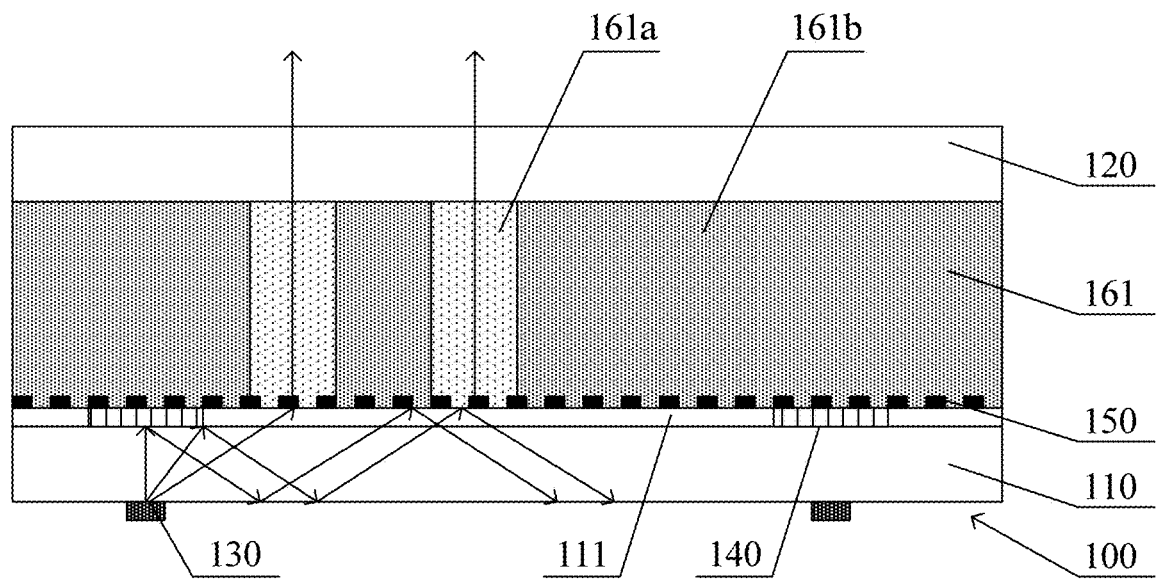
FIG. 3 is a schematic diagram of a structure of a display panel according to an embodiment of the present disclosure.

FIG. 3 is a schematic diagram of a structure of a display panel according to an embodiment of the present disclosure. The display panel 100 according to an embodiment of the present disclosure may include a first substrate 110 and a second substrate 120 arranged in box alignment, point light sources 130 in an array arrangement are arranged on a side of the first substrate 110 away from the second substrate 120, optical coupling devices 140 corresponding to the point light sources 130 one by one are arranged on a side of the first substrate close to the second substrate 120, a grating layer 150 is arranged on a side of the optical coupling devices 140 away from the first substrate 110, and a liquid crystal layer 161 is arranged between the first substrate 110 and the second substrate 120. From a manufacturing process point of view, the liquid crystal layer 161 in FIG. 3 may be obtained after the above structure (including the point light sources 130, the optical coupling devices 140, and the grating layer 150) is formed on the first substrate 110, and liquid crystal is filled after the first substrate 110 and the second substrate 120 are arranged in box alignment.

In the above structure of an embodiment of the present disclosure, the optical coupling device 140 is arranged to reflect a light emitted by the corresponding point light source 130, penetrating the first substrate 110, and reaching the optical coupling device 140, into the first substrate 110, and the light in the first substrate 110 is totally reflected and propagated in the first substrate 110 (at this time, the first substrate 110 can be regarded as a waveguide layer).

According to the display panel 100 of an embodiment of the present disclosure, open or close of a grating in the grating layer 150 can be controlled by adjusting the refractive index of the liquid crystal in the liquid crystal layer 161, so that a light in the first substrate 110 exits from an open grating in the grating layer 150. That is, the display panel 100 may be arranged to control the open or close of the grating in the grating layer 150 by adjusting the refractive index of the liquid crystal, so that light in the first substrate 110 exits from the open grating in the grating layer 150. When the refractive index of the liquid crystal is different from a refractive index of the grating in the grating layer 150, the grating is open, and when the grating is open, the light in the first substrate 110 exits from the open grating in the grating layer 150. The display panel 100 can realize display of different gray scales by adjusting a difference between the refractive index of the liquid crystal and the refractive index of the grating in the grating layer 150.

The display panel 100 according to an embodiment of the present disclosure is an LCD panel capable of realizing transparent display. The light sources of the display panel 100 do not use edge-lit backlight modules, but point light sources 130 in an array arrangement are arranged on a lower surface (i.e., a side of the first substrate 110 away from the second substrate 120) of a lower substrate (i.e., the first substrate 110) of the display panel 100. The point light sources 130 may be attached to the lower surface of the first substrate 110. An upper surface of the first substrate (i.e., a side of the first substrate 110 close to the second substrate 120) is provided with optical coupling devices 140 arranged in one-to-one correspondence with the point light sources 130. The point light sources 130 and the optical coupling devices 140 may be regarded as backlight modules of the display panel 100.

The lights emitted by the point light sources 130 may be divergent, and a divergence angle of a light is about ±60 degrees. The lights emitted by the point light sources 130 pass through the first substrate 110 and illuminate on the optical coupling devices 140 corresponding to the point light sources 130 one by one. The lights at these angles may be coupled into the first substrate 110 at an angle greater than (or equal to) a total reflection angle of the first substrate 110, so that the lights propagate in the first substrate 110 in a total reflection manner, and the light propagating in the total reflection in the first substrate 110 may be regarded as the waveguide backlight of the display panel 100. In the display panel 100 according to an embodiment of the present disclosure, the point light sources 130 are arranged on the side of the first substrate 110 away from the second substrate 120, and the optical coupling devices 140 are arranged on the side of the first substrate 110 close to the second substrate 120. The point light sources 130 and the optical coupling devices 140 are both arranged in an array form and are in a one-to-one correspondence relationship, and an arrangement gap of the light source devices (i.e., the point light sources 130 and the optical coupling devices 140) in the display panel 100 is large. The light source device is formed by adopting a structure of combining the above-mentioned point light source 130 with the optical coupling device 140. In a design of a structure of the light source device, the optical coupling device 140 may expand a divergence angle of a common single point light source 130, that is, from about ±60 degrees to an entire waveguide. Therefore, a required number of point light sources 130 may be reduced, thereby reducing power consumption and realizing transparent display. Moreover, due to the arrayed arrangement, compared with the solution of the edge-lit backlight module, uniformity and total brightness of the backlight are greatly improved. In other words, by replacing the backlight module in the ordinary LCD panel with the light source device (i.e., including the point light source 130 and the optical coupling device 140) in an embodiment of the present disclosure, the backlight module may be made into a transparent form, that is, the transparent display effect of the LCD panel may be realized without using the edge-lit backlight module, and compared with the LCD panel of the direct-down backlight module, the number of the point light sources 130 may be reduced to a great extent, which is beneficial to reducing power consumption and material cost. In addition, based on the light source device used in combination with the above-mentioned point light sources 130 and the optical coupling devices 140, the waveguide backlight coupled into the first substrate 110 by the optical coupling device 140 (i.e., the light propagating through total reflection in the first substrate 110) has considerable light intensity and visible area, which may provide a light source basis for a high-brightness transparent display panel.

The optical coupling devices 140 are arranged on the upper surface of the first substrate 110 and are arranged in an array form. Since the optical coupling devices 140 are convex structures on the first substrate 110, in order to ensure that lights keep total reflection propagation before reaching the grating layer 150, other areas (111 in FIG. 3) between the first substrate 110 and the grating layer 150 except for the optical coupling devices 140 may be filled with materials with the same refractive index as the first substrate 110. In this way, it can be ensured that light propagates straight in the first substrate 110 and the area 111. At this time, the waveguide layer of the waveguide backlight is the first substrate 110 and the area 111.

In the display panel 100 according to an embodiment of the present disclosure described above, the point light sources 130 and the optical coupling devices 140 are used as backlight modules to introduce the lights into the first substrate 110 for total reflection propagation. The light emitting structure of the display panel 100 includes a grating layer 150 and a liquid crystal layer 161, wherein the grating layer 150 may be a light output grating, and the liquid crystal layer 161 determines open or close of the light output grating. The open or close of the grating layer 150 may be controlled by adjusting a refractive index of the liquid crystal layer 161. When the grating layer 150 is open, the waveguide backlight in the first substrate 110 may be taken out and emitted from the second substrate 120 side. When the grating layer 150 is closed, the waveguide backlight in the first substrate 110 still propagates in total reflection, presenting a dark state in which no light is emitted.

In an embodiment of the present disclosure, controlling the refractive index of the liquid crystal layer 161 may be controlling the refractive index of the liquid crystal in the first area 161a and the refractive index of the liquid crystal in the second area 161b in the liquid crystal layer 161 to be different. Accordingly, the gratings in the grating layer 150 open and close in different areas, and the open and close of the gratings are related to the refractive index of the liquid crystal in the corresponding positions. For example, the first area 161a has an orthographic projection area on the plane where the grating layer 150 is located. The open or close of the grating in the orthographic projection area is determined by the refractive index of the liquid crystal in the first area 161a. When the refractive index of the liquid crystal in the first area 161a is adjusted, the open or close of the grating in the orthographic projection area may be controlled. When the grating in the orthographic projection region is open, lights are taken out and emitted from the position of the first area 161a. In FIG. 3, the first area 161a of emitted lights is indicated by low density black dot filling, the grating in FIG. 3 is in a closed state, and the second area 161b of emitted light is indicated by high density black dot filling. In addition, in an embodiment of the present disclosure, directional display may be realized by using a grating light exit mode, and the display panel 100 provided in an embodiment of the present disclosure may be applied to the technical fields of projection, near-eye display, Augmented Reality (AR) and Virtual Reality (VR) and the like.

The display panel 100 according to an embodiment of the disclosure includes a first substrate 110 and a second substrate 120 being arranged in box alignment, a side of the first substrate 110 away from the second substrate 120 is provided with point light sources 130 arranged in an array, a side of the first substrate 110 close to the second substrate 120 is provided with optical coupling devices 140 corresponding to the point light sources 130 one by one, and a side of the optical coupling devices 140 away from the first substrate 110 is provided with a grating layer 150, a liquid crystal layer 161 is arranged between the first substrate 110 and the second substrate 120, lights emitted from the corresponding point light sources 130, penetrating the first substrate 110, and reaching the optical coupling devices 140 are reflected into the first substrate 110 through the optical coupling devices 140 arranged one-to-one corresponding to the point light sources 130, so that the lights are totally reflected and propagated in a waveguide layer. In addition, since a refractive index of the liquid crystal layer 161 has an adjustable performance, open or close of the grating in the grating layer 150 may be controlled by adjusting the refractive index of the liquid crystal in the liquid crystal layer 161 so that the lights in the first substrate 110 emit from the open grating in the grating layer 150. According to the display panel 100 according to an embodiment of the present disclosure, in one aspect, the combination of the point light sources 130 and the optical coupling devices 140 is adopted as a light source device, so that the lights with a certain divergence angle emitted by the point light sources 130 may be coupled into the first substrate 110, thereby expanding to a whole waveguide to form a waveguide backlight, and the point light sources 130 and the optical coupling devices 140 are arranged in array, thus not only reducing the number of required point light sources 130 in the display panel 100, thereby reducing power consumption and realizing transparent display, but also greatly improving the uniformity and total amount of backlight. In another aspect, the grating layer 150 and the liquid crystal layer 161 are used as light exit structures, and the pixel size of the display panel 100 is favorably reduced through the pixelated light output mode of the liquid crystal layer 161, thereby greatly improving the Pixels Per Inch (PPI) of the display panel 100; furthermore, directional display may be realized by using a grating light exit mode, that is, the display panel 100 according to an embodiment of the present disclosure can be applied to the technical fields of projection, near-eye display, AR, VR, and the like.

Figure 4:
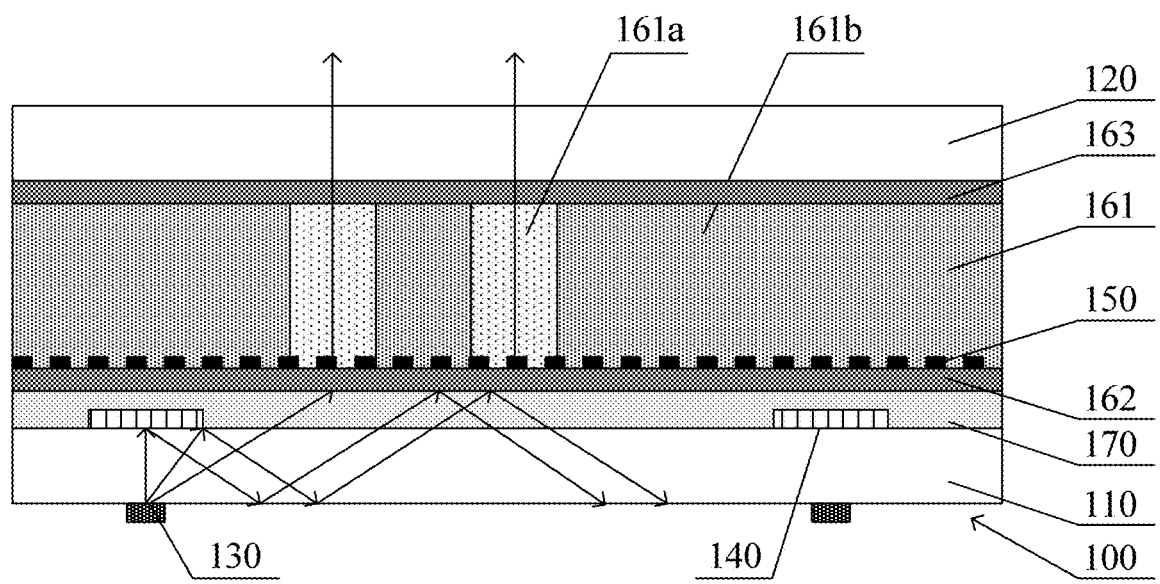
FIG. 4 is a schematic diagram of a structure of another display panel according to an embodiment of the present disclosure.

In one exemplary embodiment, FIG. 4 is a schematic diagram of a structure of another display panel according to an embodiment of the disclosure. Based on the structure of the display panel 100 shown in FIG. 3, the display panel 100 of an embodiment of the present disclosure may further include a first electrode layer 162 arranged between the optical coupling device 140 and the grating layer 150, and a second electrode layer 163 arranged on the side of the liquid crystal layer 161 close to the second substrate 120. As can be seen from FIG. 4, the upper and lower sides of the liquid crystal layer 161 are respectively provided with a second electrode layer 163 and a first electrode layer 162.

In an embodiment of the present disclosure, a voltage may be provided to the first electrode layer 162 and the second electrode layer 163 through a processing device connected to the first electrode layer 162 and the second electrode layer 163, thereby controlling the refractive index of the liquid crystal in the liquid crystal layer 161, that is, the first electrode layer 162 and the second electrode layer 163 are configured to be provided with the voltage, thereby controlling the refractive index of the liquid crystal in the liquid crystal layer 161.

In an embodiment of the present disclosure, a structure of the liquid crystal layer 161 and its upper and lower electrode layers thereof is shown in FIG. 4, the first electrode layer 162 is a lower electrode of the liquid crystal layer 161, and the second electrode layer 163 is an upper electrode of the liquid crystal layer 161, the processing device drives the refractive index of the liquid crystal in the liquid crystal layer 161 to change by controlling the upper and lower electrodes of the liquid crystal layer 161, and ensures that the refractive index of the liquid crystal matches the upper and lower substrates, so that a display effect of the liquid crystal layer 161 will not be affected. The liquid crystal layer 161 is a key factor for realizing display, and controlling a change of the refractive index of the liquid crystal layer 161 may realize light and dark control of pixels in the display panel 100.

In one exemplary embodiment, the refractive index of the liquid crystal in the liquid crystal layer 161 may be controlled to be pixelated when a voltage is provided to the liquid crystal layer 161 using the first electrode layer 162 and the second electrode layer 163 by providing a structure of the first electrode layer 162 and the second electrode layer 163, as shown in the first area 161a and the second area 161b in FIGS. 3 and 4, and only a portion of the first area 161a and the second area 161b are shown in FIGS. 3 and 4. For example, both the first electrode layer 162 and the second electrode layer 163 may include a plurality of pixel electrodes, and the pixel electrodes in the first electrode layer 162 and the second electrode layer 163 form upper and lower pixel electrode pairs, and a pixelated distribution of refractive indices of liquid crystal is realized by energizing the upper and lower electrode pairs. For another example, the first electrode layer 162 may be a public electrode layer, and the second electrode layer 163 includes a plurality of pixel electrodes, a reference voltage is provided to the first electrode layer 162 and different voltages are provided to the pixel electrodes in the second electrode layer 163 to realize a pixelated distribution of refractive indices of the liquid crystal.

In one exemplary embodiment, the grating structure in the grating layer 150 may be regarded as pixel gratings corresponding to the pixels of the display panel one by one. The pixel gratings in the grating layer 150 may be uniform grating structures or may be independent grating structures. In an embodiment of the present disclosure, a certain pixel of the display panel has an orthographic projection area on the plane where the grating layer 150 is located, and the grating in the orthographic projection area is regarded as a pixel grating corresponding to the certain pixel. Therefore, one implementation method for controlling the refractive index of the liquid crystal in the liquid crystal layer 161 may be as follows: the display panel 100 may control the refractive index of the liquid crystal in the first area 161a of the liquid crystal layer 161 to be unequal to the refractive index of the grating layer 150, so that the grating in the orthographic projection area of the first area 161a on the plane where the grating layer 150 is located is open, and the lights reaching the open grating are emitted from the open grating; referring to FIG. 4, the first area 161a in this case may correspond to one or more pixels in the display panel 100; and the display panel 100 may control the refractive index of the liquid crystal in the second area 161b of the liquid crystal layer 161 to be equal to the refractive index of the grating layer 150, so that the grating in the orthographic projection area of the second area 161b on the plane where the grating layer 150 is located is closed, and the lights reaching the closed grating are totally reflected on the surface of the closed grating close to the first substrate 1101; referring to FIG. 4, the second area 161b in this case may correspond to one or more pixels in the display panel 100.

In an embodiment of the present disclosure, a pixel size of the display panel 100 may be made small based on the pixelated light output design of the liquid crystal layer 161. For example, the pixel size of the display panel 100 may be 5 to 50 times the grating period in the grating layer 150, and usually several grating periods (several micrometers) may be used as the pixel size (pitch) of the display panel 100. For example, the grating period is usually in a level of 100 nanometers (nm), for example, 300 nm to 800 nm, while using a grating to perform diffraction requires a plurality of grating periods, usually 5 to 10 grating periods may be used to meet diffraction requirements. Taking 5 grating periods as an example, the pixel period is about 1.5 microns (μm) to 4 μm, of course, the number of periods is not fixed, and is related to factors such as incident light conditions and grating materials. For another example, if the pixel size is about 40 μm and the grating period is 1 μm or less, that is to say, there can be 40 or more grating periods in one pixel, and the requirement of "the grating deflects a light to a specific angle to exit the light" may be met. When a directivity requirement for display is not high, a larger light exit angle range may be obtained with a smaller number of grating periods (e.g., 5 grating periods in the above example) to realize a larger viewing angel display, and the top limit number of grating periods may be calculated according to the size of the display panel and PPI (e.g., 40 or more grating periods in the above example). Based on the light exit structure (the liquid crystal layer 161 and the grating layer 150) of an embodiment of the present disclosure and a quantitative relationship between the pixel size of the display panel 100 and the grating period, the pixel size of the display panel 100 may be reduced, thereby greatly improving the PPI of the display panel 100.

The optical coupling device 140 is, for example, a grating structure, that is, the optical coupling device 140 is a convex structure on the first substrate 110, and a flat layer 170 may be arranged between the optical coupling device 140 and the first electrode layer 162 to fill a convex portion of the optical coupling device 140 to ensure a stability of the grating structure. In the display panel 100 of an embodiment of the present disclosure, the light coupled into the first substrate 110 for total reflection propagation regards the first substrate 110, the flat layer 170, and the first electrode layer 162 as a waveguide layer for light transmission, that is, the first substrate 110, the flat layer 170, and the first electrode layer 162 may all adopt materials with a higher refractive index to ensure total reflection propagation of the light in the waveguide layer before entering into the liquid crystal layer 161.

In addition, the display panel 100 may cooperate with the grating layer 150 of low refractive index, the second electrode layer 163, and the second substrate 120 to ensure that the light of the light source may be locked in the waveguide layer under a dark pixel to prevent a light leakage. It is also satisfied that the emitted light will not be totally reflected on the surfaces of the second electrode layer 163 and the second substrate 120, thus ensuring effective light exit of bright pixels.

For example, the refractive indices of the first substrate 110, the flat layer 170 and the first electrode layer 162 are all 1.7 and the refractive index of the grating layer 150 is 1.5. When the refractive index of the liquid crystal in the second area 161b is controlled to be equal to the refractive index of the grating layer 150 (n=1.5), the grating in the corresponding area is closed, and the refractive index of the liquid crystal in the second area 161b is smaller than the refractive index of the first substrate 110 (n=1.7), the interface of the waveguide layer (i.e., an interface between the first electrode layer 162 and the grating layer 150) may be regarded as two layers of uniform media. At this time, the light is locked in the waveguide layer at a total reflection propagation angle greater than the total reflection critical angle (62 degrees), and the pixel corresponding to the second area 161b is in a dark state. When the refractive index of the liquid crystal in the first area 161a is controlled to be 1.7, a periodic refractive index change is formed with the corresponding grating layer 150, the grating in the corresponding area is open, the light is diffracted at this point and passes out of the waveguide layer, and the pixel corresponding to the first area 161b is in a bright state.

Since the gray scale of the display panel is usually 0 to 255, the display effect of different gray scales is usually required in display. In one exemplary embodiment, a bright state display may be realized by controlling the refractive index of the liquid crystal in the liquid crystal layer 161 to be unequal to the refractive index of the grating layer 150. In this way, the display panel 100 may change a diffraction efficiency of light passing through the open grating by controlling the refractive index of the liquid crystal in the first area 161a to change within a preset refractive index range, so as to realize display of different gray scales.

Figure 5:
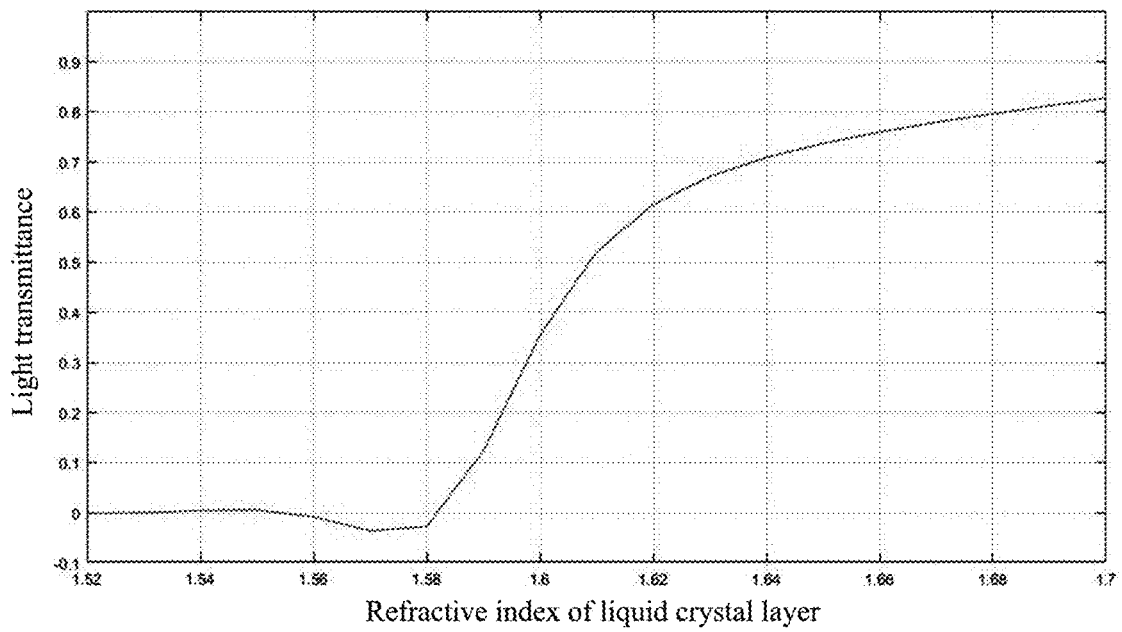
FIG. 5 is a graph of relationship between a refractive index of a liquid crystal layer and a light transmittance of a grating layer in a display panel according to an embodiment of the present disclosure.

FIG. 5 is a graph of relationship between a refractive index of a liquid crystal layer and a light transmittance of a grating layer in a display panel according to an embodiment of the disclosure. Assuming that the refractive index of the waveguide layer is 1.7 and the refractive index of the grating layer 150 is 1.52, the refractive index of the liquid crystal layer 161 may be controlled to change within a preset refractive index range (e.g., 1.52-1.7) to obtain the light transmittance curve shown in FIG. 5. Since the graph shown in FIG. 5 is obtained through a plurality of discrete points, a simulated graph may have errors due to the selection of discrete points, but it can be seen that the obvious trend is that when the refractive index of the liquid crystal layer 161 is between 1.58 and 1.62, the light transmittance of the grating layer 150 is obviously improved, and the refractive index of the liquid crystal layer 161 may be changed between 1.58 and 1.7 to realize the display of different gray scales. That is, a degree of difference between the refractive index of the liquid crystal in the first area of the liquid crystal layer and the refractive index of the grating layer is adjusted to achieve different gray scale changes. The larger the difference between the refractive index of the liquid crystal and the refractive index of the grating is, the higher the intensity of the emitted light is, but it is not excluded that the intensity of the emitted light has similar periodic fluctuations as the difference increases. The light transmittance of the light passing through the open grating in an embodiment of the present disclosure refers to a diffraction efficiency of the light passing through the open grating or the coupled light intensity.

In one exemplary embodiment, the point light source 130 may be a Light Emitting Diode (LED) or a Micro LED with a smaller volume.

Embodiments of the present disclosure do not limit a device type of the point light source 130. As long as it is a light source device that can realize a divergence angle of about ±60 degrees and has a small volume and can be attached to the lower surface of the first substrate 110, it can be used as a point light source 130 in embodiments of the present disclosure.

In one exemplary embodiment, the optical coupling device 140 may adopt a grating structure of a radial grating or a holographic grating.

Figure 6:
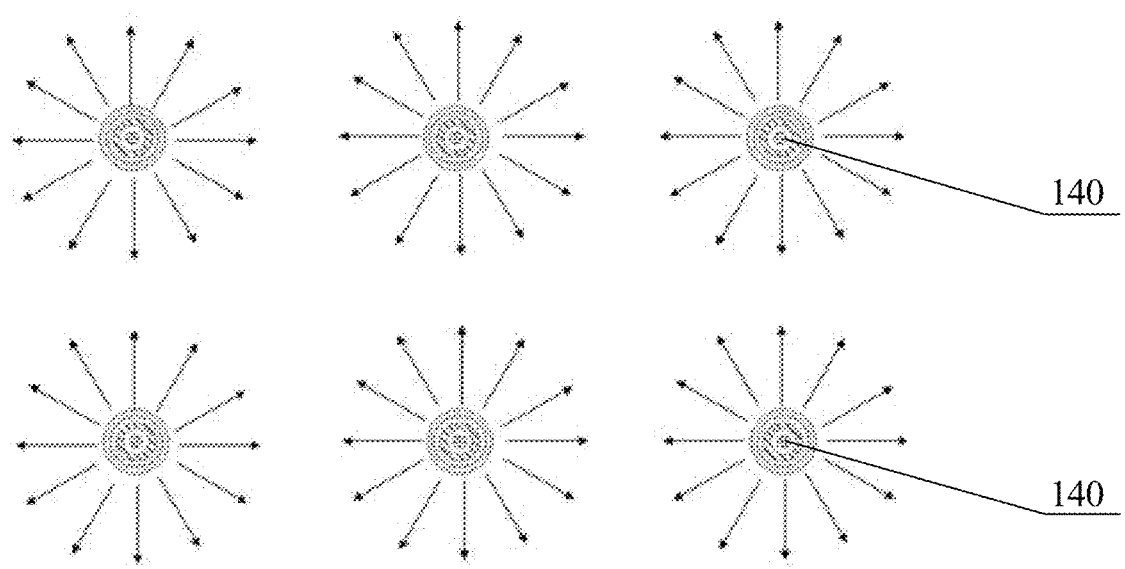
FIG. 6 is a schematic diagram of a structure of an optical coupling device in a display panel according to an embodiment of the present disclosure.

An implementation of the radial grating will be described in an example where the radial grating is used as the grating structure of the optical coupling device 140 in an embodiment of the present disclosure. FIG. 6 is a schematic diagram of a structure of an optical coupling device in a display panel according to an embodiment of the disclosure, FIG. 6 is a top view of the optical coupling device 140, and the optical coupling device 140 in FIG. 6 is a radial grating, FIG. 7 is a schematic diagram of a structure of a radial grating in a display panel according to an embodiment of the disclosure, and FIG. 7 illustrates an overall structure of the radial grating 140a and a partial amplification structure of the radial grating 140a. The radial grating 140a in an embodiment of the present disclosure includes a plurality of annular wire grids 141a arranged in concentric circles, and a grating period of the radial grating 140a gradually increases from a position close to the center of the circle to a position away from the center of the circle along the radius of the annular wire grids 141a. It can be seen that the radial grating 140a is radially symmetric, that is, the grating period corresponding to the same radius r is the same, and the radial grating is a special grating which period p varies along the radius r, and the grating vector k radiates outward along the center of the circle. As shown in FIG. 7, the period of the radial grating 140a increases along its radius r from P1 near the center of the circle to P3 away from the center of the circle. The radial grating 140a is generally annular (as shown in FIG. 7). During processing, the radial grating may be divided into a plurality of area microelements, such as P1 to P3 in FIG. 7. Each area microelement can be made as small as possible so that the radial grating can be closer to the annular ring. FIG. 7 schematically shows area microelements P1 to P3 in different grating directions, such as area microelements P1 to P3 in directions K1 and K2, but the grating periods in the same radius r are the same. Since the structure of each area microelement is rotationally symmetrical, the area 11 shown in FIG. 7 (the area with light gray background in FIG. 7) completely overlaps with an area 21 (an area with dark gray background in FIG. 7) after rotating counterclockwise for a certain angle, so only the grating of radial grating in one grating direction may be considered in design, and K1 direction is taken as an example to illustrate, as shown in FIG. 8, which is the grating structure of area microelement in K1 direction in the radial grating shown in FIG. 7. It can be seen that the grating periods of the microelements P1, P2, P3 in different areas change gradually.

The radial grating is similar to a common diffraction grating except that grating lines are radially symmetric, a spacing of the grating lines is variable across the entire plane (referring to a plane where the radial grating is located), and the substrate is of even aspheric shape. For a planar grating, the light traces to the grating and refracts according to the following formula.

$$n_1 \sin\theta_1 \pm n_2 \sin\theta_2 = m\frac{\lambda}{p}; m = 0, \pm 1, \pm 2\ldots, \quad (1)$$

In the above formula (1), p is a period of the radial grating, $\theta_1$ is an angle of incident angle, $\theta_2$ is an angle of exit angle, m is a diffraction level, $\lambda$ is a wavelength of the light, $n_1$ is a refractive index of the medium (i.e. waveguide layer) where the light is taken out by the grating layer, and $n_2$ is a refractive index of the medium (i.e. liquid crystal layer) where the light is taken out by the grating layer. As shown in FIG. 8, incident angles $\theta_1$ of the point light source 130 reaching to different positions of the radial grating are different. According to the above formula (1), in order to ensure that the emitted angle $\theta_2$ meets the total reflection condition of the first substrate 110, the grating periods of each area (P1, P1, and P3) are calculated to be related to the incident angle $\theta_1$ of the light at that position. Since the incident angle $\theta_1$ is gradual, the grating period p is gradual, that is, P1, P2, and P3 are gradual. Since there is no perfectly continuous gradient grating, each area microelement has a certain width, for example, the period of P1 is fixed, but the incident angle $\theta_1$ changes continuously, so the emitted angle $\theta_2$ will also continuously change. A margin amount may be considered when designing the period of each area microelement, so that all the emitted angles $\theta_2$ in each area microelement meet a total reflection condition.

In addition, the radial grating is located in a plane that allows the period p to vary in plane according to the following equation.

$$p(d) = +A_0 + A_1 d^1 + A_2 d^{-1} + A_3 d^2 + A_4 d^{-2} + \ldots; \quad (2)$$

In the above formula (2), A is an expansion coefficient, d is a normalized polar coordinate, and d is defined by the following formula.

$$d = \frac{r}{R} \quad (3)$$

In the above formula (3), r is polar coordinates on the surface and R is a normalized radius of the radial grating surface.

According to the above-mentioned radial grating representation method, grating parameters applicable to an embodiment of the present disclosure may be designed, and the light emitted by the point light source 130 and reaching the radial grating is coupled into the waveguide layer at a total reflection angle, so as to be distributed throughout the first substrate 110. Similarly, taking the refractive index of the first substrate 110 equal to 1.7 and the refractive index of the second substrate 120 equal to 1.5 as an example, designing a radial grating to diffract all lights at an angle greater than a total reflection critical angle of 62 degrees may couple the lights emitted by the point light source 130 into the first substrate 110. The point light sources 130 and the radial grating in an array arrangement may greatly improve the uniformity of light and an overall light intensity in the first substrate 110, and may ensure that the spacing between the point light sources 130 is not too small, thereby maintaining a transparency of the overall light source device (i.e., including the point light sources 130 and the radial grating).

Different grating structures exist in different area microelements of the radial grating, that is, the periods of different area microelements in each radial grating in FIG. 7 are different. In the manufacturing process, it may be processed in different areas, for example, different grating patterns may be made in different areas by using a technology of interference exposure, laser direct writing, or nanoimprint, or, a pre-designed master plate may be used for nanoimprint, and the radial grating may be manufactured at one time regardless of areas. The radial grating may be maintained to match a position of the point light source 130 during processing. In addition, an embodiment of the present disclosure does not limit the optical coupling device 140 to be only a holographic grating or a radial grating. As long as it is a grating structure or other structure that can realize total reflection propagation after coupling a light emitted from a point light source into a waveguide layer, it may be used as the optical coupling device 140 in an embodiment of the present disclosure.

In one exemplary embodiment, FIG. 8 is a schematic diagram of a structure of a holographic grating. The radial grating uses a method of area division to disperse the required optical devices into a plurality of area microelements of common gratings to achieve a relatively continuous effect. A structure of the holographic grating may be a grating with gradually changing periods. As shown in FIG. 8, the holographic grating in an embodiment of the present disclosure may include a plurality of bar-shaped wire grids arranged in parallel, and the grating period of the holographic grating gradually increases along a first direction, and the first direction is perpendicular to the bar-shaped wire grids. In FIG. 8, the grating period P1 in the left area is the smallest, the grating period P3 in the right area is the largest, and the first direction in FIG. 8 is a direction from left to right. The grating lines of the holographic grating are similar to those of the common grating, the periodic gradient of the holographic grating is similar to that of the structure of the wire grids in the radial grating shown in FIG. 7 in one direction, and the total reflection of light is similar to that of the radial grating.

The function of the grating is to deflect a light, the radial grating and the holographic grating deflect the light into the first substrate 110, while the grating layer 150 in an embodiment of the present disclosure deflects the light out of the waveguide layer, that is, the light is output from the waveguide layer to realize display. The basic principle followed in deflecting the light into or out of the waveguide layer is the same, i.e. based on the above formula (1). The light deflection effect of the grating is caused by the periodic change of the material. Assuming that the refractive index of the grating layer 150 is n1 and the refractive index of the liquid crystal layer 161 is n2, the periodically changing of both n1 and n2 realizes the diffraction effect, wherein the diffraction angle is determined by the period and the diffraction efficiency is determined by n1 and n2. Since n1 is fixed after the grating layer is manufactured, the diffraction efficiency may be adjusted by controlling the change of the refractive index n2 of the liquid crystal layer 161, that is, by controlling the change of the refractive index n2 of the liquid crystal layer 161, the display effect of different gray scales may be realized.

According to the display panel 100 according to an embodiment of the present disclosure, in one aspect, a direct down point light source 130 is used as a backlight, in order to ensure the transparency of the display panel 100, a density of the point light source 130 can be small, and the array light source arrangement (i.e., the point light sources 130 and the optical coupling devices 140 arranged in the array) is adopted, so that the light propagation in the substrate has enough directions, attenuation directions tend to be uniform, the optical coupling device 140 may couple the light emitted by the point light source 130 into the waveguide layer, greatly improving the light emitting range of a single point light source 130, effectively avoiding the problem of uneven energy in a lower substrate caused by an edge-lit type backlight light taking mode, and greatly improving a brightness of the display. And the spacing between different point light sources 130 is large enough to ensure the transparency of the first substrate without affecting the transparent display function of the entire display panel 100. In other aspect, the liquid crystal layer 161 and the controllable grating layer 150 are used as light output structures, and the pixelated distribution of the refractive index of the liquid crystal in the liquid crystal layer 161 is controlled by the electrode layer, thus controlling two states of open and close of the pixel grating. When the refractive index of the grating is equal to the refractive index of the liquid crystal, the grating is closed, and the light is totally reflected and propagated in the waveguide layer, a dark state of emitting no light is presented. When the refractive index of the grating and the refractive index of the liquid crystal differ (i.e. unequal), the grating is open, and the light is diffracted out at an interface, a bright state is presented. In another aspect, the directivity of the display may be realized by using a grating light exit mode, PPI of the display panel may be improved, and the PPI may be applied to projection, near-eye display and the like; and a transparent light source device may also be used as an AR display, and compared with common AR equipment, the PPI has great portability.

Based on the display panel 100 provided in the above embodiment of the present disclosure, an embodiment of the present disclosure also provides a display apparatus, including the display panel 100 provided in any of the above embodiments of the present disclosure. The display apparatus may be an LCD display apparatus for realizing transparent display. Based on the technical effect of the display panel 100 provided in the above embodiment, the display apparatus provided in an embodiment of the present disclosure may also avoid the problems of uneven display brightness and low energy in a transparent LCD display apparatus using an edge-lit backlight module. In addition, PPI of the display apparatus may be improved, and directional display may be realized by using a grating light exit mode, so that the display apparatus may be applied to the technical fields of projection, near-eye display, AR, VR and the like.

Based on the display panel 100 provided in the above embodiments of the present disclosure, an embodiment of the present disclosure also provides a driving method of the display panel, which is executed by the display panel provided in any of the above embodiments of the present disclosure. FIG. 9 shows a flowchart of a driving method of a display panel provided in an embodiment of the present disclosure, including the following steps.

In S310, point light sources in the display panel are turned on so that an optical coupling devices corresponding to the point light sources reflect lights emitted by the point light sources, penetrating a first substrate, and reaching the optical coupling devices, into the first substrate.

In S320, a refractive index of a liquid crystal layer in the display panel is adjusted to control open or close of a grating in a grating layer so that the lights in the first substrate emit from an open grating in the grating layer.

The driving method according to an embodiment of the present disclosure is performed by the display panel 100 in any of the embodiments shown in FIGS. 3 to 4 and FIGS. 6 to 8, the structure of the display panel 100 and the functions realized by the devices and the film layers have been described in detail in the above embodiments, so they will not be repeated here. In a driving method of an embodiment of the present disclosure, the point light source of the display panel is first turned on, and is driven after the point light source is light up, that is, the point light source emits a light, and the light is couple into the first substrate by an optical coupling device for a total reflection propagation, so that a transparent display effect of the display panel is realized by the driving method; subsequently, open or close of the grating layer is controlled by adjusting the refractive index of the liquid crystal layer in the display panel. When the grating layer is open, a waveguide backlight in the first substrate may be taken out and be emitted from a side of the second substrate. When the grating layer is closed, the waveguide backlight in the first substrate is still totally reflected and propagated, presenting a dark state of emitting no light.

The lights emitted by the point light sources may be divergent, for example, the divergence angle is about ±60 degrees, the lights emitted by the point light sources pass through the first substrate and illuminate on the optical coupling devices corresponding to the point light sources one by one, and the lights at these angles may be coupled into the first substrate at an angle greater than (or equal to) the total reflection angle of the first substrate so that the lights propagate in the first substrate in a total reflection mode, and the lights propagating in the total reflection mode in the first substrate may be regarded as a waveguide backlight of the display panel. In the display panel of an embodiment of the present disclosure, the point light sources are arranged on a side of the first substrate away from the second substrate, and the optical coupling devices are arranged on a side of the first substrate close to the second substrate. The point light sources and the optical coupling devices are arranged in an array form and are in a one-to-one correspondence relationship, and an arrangement spacing of the light source devices (i.e., the point light sources and the optical coupling devices) in the display panel is large. The light source device is formed by adopting a structure of combining the above-mentioned point light source with the optical coupling device. In the design of a structure of the light source device, the optical coupling device may expand a divergence angle of a common single point light source, that is, from about ±60 degrees to an entire waveguide, so that a required number of point light sources 130 may be reduced, thereby reducing power consumption and realizing transparent display. Moreover, due to the arrayed arrangement, compared with the solution of the edge-lit backlight module, uniformity and total brightness of the backlight are greatly improved. In other words, by replacing the backlight module in the ordinary LCD panel with the light source device (i.e., including the point light source 130 and the optical coupling device 140) in an embodiment of the present disclosure, the backlight module may be made into a transparent form, that is, the transparent display effect of the LCD panel may be realized without using the edge-lit backlight module, and compared with the LCD panel of the direct-down backlight module, the number of the point light sources 130 may be reduced to a great extent, which is beneficial to reducing power consumption and material cost.

In addition, based on the light source device used in combination with the above-mentioned point light sources and the optical coupling devices, the waveguide backlight coupled into the first substrate by the optical coupling device (i.e., the light propagating through total reflection in the first substrate) has considerable light intensity and visible area, which may provide a light source basis for a high-brightness transparent display panel.

In an embodiment of the present disclosure, controlling the refractive index of the liquid crystal layer 161 may not control the entire liquid crystal layer 161 to have a same refractive index. Referring to FIG. 3, the refractive index of the liquid crystal in the first area 161a and the refractive index of the liquid crystal in the second area 162b in the liquid crystal layer 161 may be controlled to be different. Accordingly, open and close of the grating layer 150 may not be uniform open or close of the entire grating layer 150, and the gratings in the grating layer may open and close in different areas. The open and close of the grating are related to the refractive index of the liquid crystal in the corresponding position. For example, the first area 161a has an orthographic projection area on a plane where the grating layer 150 is located. The open or close of the grating in the orthographic projection area is determined by the refractive index of the liquid crystal in the first area 161a. When the refractive index of the liquid crystal in the first area 161a is adjusted, the open or close of the grating in the orthographic projection area may be controlled. When the grating in the orthographic projection area is open, a light is taken out and is emitted from a position of the first area 161a. In addition, in an embodiment of the present disclosure, directional display may be realized by using a grating light exit mode, and the display panel in an embodiment of the present disclosure may be applied to the technical fields of projection, near-eye display, AR, VR and the like.

According to the driving method of the display panel according to an embodiment of the present disclosure, by turning on the point light source in the display panel, the light emitted by the point light source, penetrating the first substrate, and reaching the optical coupling device is reflected into the first substrate by the optical coupling device corresponding to the point light source, so that the light is totally reflected and propagated in the first substrate. In addition, by adjusting the refractive index of the liquid crystal layer, the open or close of the grating in the grating layer is controlled, so that the light in the first substrate is emitted from the open grating in the grating layer. The driving method of the display panel according to the present disclosure, based on the structure of the display panel in the above-mentioned embodiment, has the same beneficial effects as those of any of the above-mentioned embodiments shown in FIGS. 3 to 8, that is, by using the combination of the point light source and the optical coupling device as the light source device, the light with a certain divergence angle emitted by the point light source may be coupled into the first substrate, thereby expanding to the entire waveguide to form the waveguide backlight, and the point light source and the optical coupling device are arranged in array, so that, not only the number of the point light sources required in the display panel is reduced, thereby reducing power consumption and realizing transparent display, but also the uniformity and the total amount of backlight are greatly improved. Directional display may be realized by driving the liquid crystal layer to emit light through the grating, that is, the display panel according to an embodiment of the present disclosure may be applied to the technical fields of projection, near-eye display, AR, VR and the like.

In one exemplary embodiment, in the driving method provided in an embodiment of the present disclosure, the display panel for performing the driving method may further include a first electrode layer and a second electrode layer, wherein the first electrode layer is arranged between the optical coupling device and the grating layer, the second electrode layer is arranged on a side of the liquid crystal layer close to the second substrate, referring to the structure of the display panel shown in FIG. 4, the second electrode layer is the upper electrode of the liquid crystal layer, and the first electrode layer is the lower electrode of the liquid crystal layer. One implementation of adjusting the refractive index of the liquid crystal layer in the display panel in an embodiment of the present disclosure may include: voltages are provided to the first electrode layer and the second electrode layer respectively to adjust the refractive index in the liquid crystal layer in the display panel.

In an embodiment of the present disclosure, the display panel controls the upper and lower electrodes (i.e., the second electrode layer and the first electrode layer) of the liquid crystal layer to drive the refractive index of the liquid crystal layer to change, and ensures that the refractive index of the liquid crystal layer matches the upper and lower substrates, so that the display effect of the liquid crystal layer will not be affected. The liquid crystal layer is a key factor to realize the display, controlling the change of refractive index of the liquid crystal layer may realize the light and dark control of pixels in the display panel.

Figure 10:
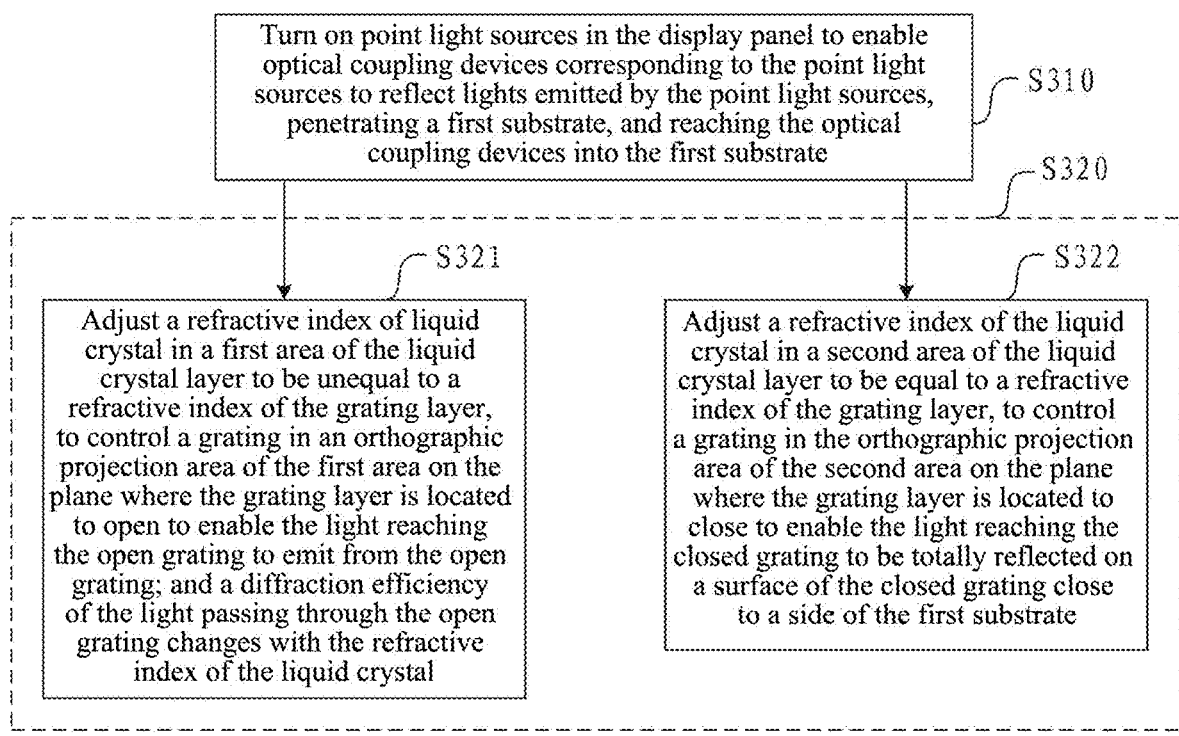
FIG. 10 is a flowchart of a driving method of another display panel according to an embodiment of the present disclosure.

In one exemplary embodiment, FIG. 10 is a flowchart of another driving method of a display panel according to an embodiment of the disclosure. In the above embodiment, it has been explained that the refractive index of the liquid crystal in the liquid crystal layer may be controlled to be pixelated when a voltage is provided to the liquid crystal layer using the first electrode layer and the second electrode layer by arranging the structure of the first electrode layer and the second electrode layer. In addition, the grating structures in the grating layer 150 may be regarded as a pixel grating corresponding to pixels of the display panel one by one. The pixel grating in the grating layer may be a unified grating structure or may be an independent grating structure. In an embodiment of the present disclosure, a pixel of the display panel has an orthographic projection area on the plane where the grating layer 150 is located, and the grating in the orthographic projection area is regarded as a pixel grating corresponding to the pixel. Therefore, based on the flow shown in FIG. 9, the above-mentioned method of adjusting the refractive index of the liquid crystal layer in the display panel to control the open or close of the grating in the grating layer, that is, the implementation method of the S320, may include at least one of S321 and S322.

In S321, the refractive index of the liquid crystal in the first area of the liquid crystal layer is adjusted to be unequal to the refractive index of the grating layer to control the grating in the orthographic projection area of the first area on the plane where the grating layer is located to open, so that the lights reaching the open grating emit from the open grating; wherein, the diffraction efficiency of the lights passing through the open grating changes with the refractive index of the liquid crystal.

In S322, the refractive index of the liquid crystal in the second area of the liquid crystal layer is adjusted to be equal to the refractive index of the grating layer control the grating in the orthographic projection area of the second area on the plane where the grating layer is located to close, so that the lights reaching the closed grating are totally reflected on the surface of the closed grating close to a side of the first substrate.

The above-mentioned steps S321 and S322 may be performed separately or in combination, and the order of execution is not limited in combination.

Other structural features in the display panel of the embodiment of the present disclosure, such as the device types of the point light source and the optical coupling device, the flat layer arranged between the optical coupling device and the first electrode layer, the waveguide layer (including the first substrate, the flat layer and the first electrode layer) having higher refractive index, the grating layer, the second electrode layer and the second substrate having lower refractive index, are the same as those of the previous embodiments of the present disclosure, and the methods and beneficial effects for realizing bright and dark state display are also the same as those of the previous embodiments of the present disclosure, so they will not be repeated here.

The driving method of the embodiment of the present disclosure is realized based on the pixelated light output design of the liquid crystal layer, the pixel size may be made small, and several grating periods (several microns) may be adopted as the pixel size of the display panel, that is, the pixel size of the display panel may be reduced, thereby greatly improving the PPI of the display panel.

An embodiment of the present disclosure also provides a computer-readable storage medium, storing executable instructions. When executable instructions are executed by a processor, the driving method of the display panel provided in any of the above embodiments of the present disclosure can be realized. The driving method of the display panel can be used to drive the display panel provided in the above embodiments of the present disclosure to display, thereby realizing a transparent display effect of the display panel. The method of driving the display panel to display by executing an executable instruction is basically the same as the driving method of the display panel provided in the above embodiments of the present disclosure, and will not be described in detail here.

Although embodiments of the present disclosure are described in the above, the above embodiments are described only for better understanding, rather than restricting the present disclosure. Any person skilled in the art can make any modifications and variations in the form and details of implementation without departing from the spirit and scope of the present disclosure. The protection scope of the present disclosure shall be determined by the scope as defined in the claims.

What we claim is:

1. A display panel, comprising: a first substrate and a second substrate being arranged in box alignment, point light sources in an array arrangement being arranged on a side of the first substrate away from the second substrate, optical coupling devices corresponding to the point light sources one by one being arranged on a side of the first substrate close to the second substrate, a grating layer being arranged on a side of the optical coupling devices away from the first substrate, a liquid crystal layer being arranged between the first substrate and the second substrate; and the optical coupling devices being arranged to reflect lights emitted by the corresponding point light sources, penetrating the first substrate, and reaching the optical coupling devices, into the first substrate.

2. The display panel according to claim 1, wherein the display panel is arranged to control open or close of a grating in the grating layer by adjusting a refractive index of liquid crystal to enable the lights in the first substrate to exit from the open grating in the grating layer.

3. The display panel according to claim 2, wherein the display panel is arranged to realize display of different gray scales by adjusting a difference between the refractive index of the liquid crystal and a refractive index of the grating in the grating layer.

4. The display panel according to claim 1, further comprising: a first electrode layer being arranged between the optical coupling devices and the grating layer, and a second electrode layer being arranged on a side of the liquid crystal layer close to the second substrate, wherein the first electrode layer and the second electrode layer is arranged to be provided with a voltage to control a refractive index of liquid crystal in the liquid crystal layer.

5. The display panel according to claim 4, further comprising: a flat layer being arranged between the optical coupling devices and the first electrode layer;
wherein refractive indices of the first substrate, the flat layer, and the first electrode layer are identical and greater than a refractive index of the grating layer.

6. The display panel according to claim 5, wherein refractive indices of the second substrate and the second electrode layer are identical, and the refractive indices of the grating layer, the second substrate, and the second electrode layer are all smaller than the refractive index of the first substrate.

7. The display panel according to claim 1, wherein the point light sources comprise a light emitting diode or a micro light emitting diode.

8. The display panel according to claim 1, wherein the optical coupling devices comprise a radial grating or a holographic grating.

9. The display panel according to claim 8, wherein the optical coupling devices comprise a radial grating, the radial grating comprises a plurality of annular wire grids arranged in concentric circles, and a grating period of the radial grating gradually increases from a position close to a center of a circle to a position away from the center of the circle along radiuses of the annular wire grids.

10. The display panel according to claim 8, wherein the optical coupling devices comprise a holographic grating, the holographic grating comprises a plurality of bar-shaped wire grids arranged in parallel, and a grating period of the holographic grating gradually increases along a first direction, and the first direction is perpendicular to the bar-shaped wire grids.

11. The display panel according to claim 1, wherein a pixel size of the display panel is 5 to 50 times a grating period in the grating layer.

12. A display apparatus, comprising the display control panel of claim 1.

13. A driving method of a display panel, the display panel being the display panel according to claim 1, the driving method comprising:
turning on the point light sources in the display panel, wherein the lights emitted by the point light sources, penetrating the first substrate, and reaching the optical coupling devices are reflected into the first substrate by the optical coupling devices corresponding to the point light sources; and
adjusting a refractive index of the liquid crystal layer in the display panel to control the open or close of a grating in the grating layer to enable the lights in the first substrate to exit from an open grating in the grating layer.

14. The driving method of the display panel according to claim 13, wherein the adjusting the refractive index of the liquid crystal layer in the display panel to control the open or close of the grating in the grating layer comprises at least one of the following:
adjusting the refractive index of the liquid crystal in a first area in the liquid crystal layer to be unequal to a refractive index of the grating layer, to control a grating in an orthographic projection area of the first area on a plane where the grating layer is located to open to enable lights reaching the open grating to exit from the open grating; wherein diffraction efficiency of lights passing through the open grating changes with the refractive index of the liquid crystal; and
adjusting the refractive index of the liquid crystal in a second area in the liquid crystal layer to be equal to the refractive index of the grating layer, to control a grating in the orthographic projection area of the second area on the plane where the grating layer is located to close to enable lights reaching the closed grating to be totally reflected on a surface of the closed grating close to the first substrate.

15. The driving method of the display panel according to claim 14, wherein the adjusting the refractive index of the liquid crystal in the first area of the liquid crystal layer to be unequal to the refractive index of the grating layer, comprises:
controlling the refractive index of the liquid crystal in the first area in the liquid crystal layer to change within a preset refractive index range to enable the diffraction efficiency of the lights passing through the open grating to change to realize display of different gray scales.

16. A computer readable storage medium storing computer executable instructions for performing the method according to claim 13.

17. The display panel according to claim 2, further comprising: a first electrode layer being arranged between the optical coupling devices and the grating layer, and a second electrode layer being arranged on a side of the liquid crystal layer close to the second substrate, wherein the first electrode layer and the second electrode layer is arranged to be provided with a voltage to control a refractive index of liquid crystal in the liquid crystal layer.

18. The display panel according to claim 2, wherein the point light sources comprise a light emitting diode or a micro light emitting diode.

19. The display panel according to claim 3, wherein the point light sources comprise a light emitting diode or a micro light emitting diode.

20. The display panel according to claim 4, wherein the point light sources comprise a light emitting diode or a micro light emitting diode.

* * * * *